United States Patent
Cheong et al.

(10) Patent No.: US 9,954,249 B2
(45) Date of Patent: Apr. 24, 2018

(54) POLYMER ELECTROLYTE AND LITHIUM RECHARGEABLE BATTERY INCLUDING THE SAME

(71) Applicant: SAMSUNG SDI CO., LTD., Yongin-si, Gyeonggi-do (KR)

(72) Inventors: Kwangjo Cheong, Yongin-si (KR); Yongbeom Lee, Yongin-si (KR); Soomi Eo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 457 days.

(21) Appl. No.: 13/802,067

(22) Filed: Mar. 13, 2013

(65) Prior Publication Data
US 2014/0065475 A1 Mar. 6, 2014

(30) Foreign Application Priority Data
Sep. 5, 2012 (KR) .......................... 10-2012-0098361

(51) Int. Cl.
*H01M 10/0565* (2010.01)
*H01M 10/052* (2010.01)
*H01B 3/18* (2006.01)
*H01M 10/0564* (2010.01)

(52) U.S. Cl.
CPC .......... *H01M 10/0565* (2013.01); *H01B 3/18* (2013.01); *H01M 10/052* (2013.01); *H01M 10/0564* (2013.01); *H01M 2300/0025* (2013.01); *H01M 2300/0082* (2013.01); *Y02E 60/122* (2013.01)

(58) Field of Classification Search
CPC .......... H01M 10/052; H01M 10/0564; H01M 10/0565; H01M 2300/0025; H01M 2300/0082; H01B 3/18; Y02E 60/122
USPC ................................ 429/188, 189, 300, 303
See application file for complete search history.

(56) References Cited

U.S. PATENT DOCUMENTS

| | | | |
|---|---|---|---|
| 5,603,982 A * | 2/1997 | Sun ............................... | 427/121 |
| 2003/0044688 A1* | 3/2003 | Kang et al. .................... | 429/317 |
| 2004/0043298 A1 | 3/2004 | Lee | |
| 2004/0209168 A1* | 10/2004 | Katsurao et al. ............. | 429/316 |
| 2005/0042515 A1* | 2/2005 | Hwang ................... | H01M 4/13 |
| | | | 429/231.95 |
| 2006/0240326 A1* | 10/2006 | Lee et al. ...................... | 429/306 |

(Continued)

FOREIGN PATENT DOCUMENTS

| | | |
|---|---|---|
| KR | 10-2004-0020631 A | 3/2004 |
| KR | 10-2005-0023123 A | 3/2005 |
| KR | 10-2006-0110635 A | 10/2006 |

*Primary Examiner* — Jonathan Jelsma
*Assistant Examiner* — Omar Kekia
(74) *Attorney, Agent, or Firm* — Lewis Roca Rothgerber Christie LLP

(57) ABSTRACT

A polymer electrolyte having improved reliability and safety by increasing thermal stability of a polymer of the polymer electrolyte and crosslinking density of a matrix of the polymer while improving electrode impregnation capability by inducing low viscosity in a pre-gel composition, and a lithium rechargeable battery including the same are disclosed. The polymer electrolyte is a cured product of a polymer electrolyte composition including a lithium salt, a non-aqueous organic solvent, and a pre-gel composition including a first monomer represented by Chemical Formula 1, a second monomer represented by Chemical Formula 2 and a third monomer represented by Chemical Formula 3.

7 Claims, 5 Drawing Sheets

(56) References Cited

U.S. PATENT DOCUMENTS

2010/0056686 A1\* 3/2010 Bergman .............. B60C 1/0016
524/396
2011/0117430 A1\* 5/2011 Cheong ................ H01M 4/587
429/207

\* cited by examiner

POLYMER ELECTROLYTE AND LITHIUM RECHARGEABLE BATTERY INCLUDING THE SAME

CROSS-REFERENCE TO RELATED APPLICATION

This application claims priority to and the benefit of Korean Patent Application No. 10-2012-0098361 filed on Sep. 5, 2012, in the Korean Intellectual Property Office, the disclosure of which is incorporated in its entirety herein by reference.

BACKGROUND

1. Field

Embodiments of the present invention relate to a polymer electrolyte and a lithium rechargeable battery including the same. More particularly, embodiments of the present invention relate to a polymer electrolyte having improved reliability and safety by increasing thermal stability of a polymer of the polymer electrolyte and crosslinking-density of a matrix of the polymer while improving electrode impregnation capability by inducing low viscosity in a pre-gel composition, and a lithium rechargeable battery including the same.

2. Description of the Related Art

Recently, due to reductions in the size and weight of portable electronic equipment, portable electronic equipment is increasingly being used. A battery having a high energy density for use as a power source of such portable electronic equipment is needed, and thus, research into a rechargeable lithium battery has been actively conducted. For a positive active material of a rechargeable lithium battery, a lithium-transition element oxide has been used. For a negative active material, a crystalline or amorphous carbon-based material or carbon composite has been used. To fabricate positive and negative electrodes, either the positive and negative active materials are coated on a current collector at an appropriate thickness, or the positive and negative active materials are made in the form of a film. To fabricate an electrode assembly, the positive and negative electrodes are then wound or stacked with an insulating separator interposed therebetween. The electrode assembly is put into a metal can or other battery container, such as a metal-laminated pouch, and an electrolyte solution is injected to fabricate a rechargeable battery.

Compared to using a can as a battery container, using a pouch as a battery container is advantageous in that the shape of the pouch may be flexibly changed and the size of the pouch may be increased. However, the pouch-type battery container is disadvantageous in that it may be easily deformed and damaged by external physical impact and it may be swollen when exposed to high temperatures. Such disadvantages are more serious for rechargeable lithium batteries using a liquid electrolyte solution than for rechargeable lithium batteries using a polymer electrolyte. Therefore, a pouch-type battery container is usually used with polymer electrolyte rechargeable lithium batteries.

The polymer electrolyte rechargeable lithium battery has advantages such as a reduced likelihood of leaking, improved safety, improved high-temperature stability, and it may be more resistant to external physical impact.

In a case of a chemical gel type polymer battery wherein the chemical gel type polymer electrolyte is formed by polymerization of a "pre-gel" after it has been injected inside a can (the "pre-gel" including a mixture of a monomer, an electrolyte solution and an initiator of battery), the viscosity of the "pre-gel" is greatly affected by the amount and molecular weight of the monomer of the "pre-gel." It is advantageous for the electrolyte solution to have low viscosity so that the electrolyte solution can be uniformly impregnated into the electrode and the separator after being injected into the battery. In particular, intercalation-deintercalation of lithium ions may not occur at a separator portion, specifically an electrode portion, without an electrolyte solution impregnated therein during charging/discharging, resulting in a reduction in capacity. In addition, it is often the case that the reliability and safety of a battery may be affected by precipitated lithium, which may result if the electrolyte solution is not uniformly impregnated in the electrode and the separator.

SUMMARY

An aspect of the present invention provides a polymer electrolyte for a lithium rechargeable battery. When it is used in the lithium rechargeable battery, the polymer electrolyte is a cured product of a polymer electrolyte composition having a viscosity so low as to improve the impregnation capability of electrode plates, thereby preventing a battery capacity from being reduced (or reducing the likelihood that a battery capacity is reduced). The polymer electrolyte can improve the reliability and safety of a lithium rechargeable battery by increasing thermal stability of a polymer of the polymer electrolyte and crosslinking-density of a matrix of the polymer by polymerization after the polymer electrolyte composition is injected.

Another aspect of the present invention provides a lithium rechargeable battery having high capacity, including having improved reliability.

According to at least one embodiment, a polymer electrolyte composition includes a pre-gel composition including a first monomer represented by Chemical Formula 1, a second monomer represented by Chemical Formula 2 and a third monomer represented by Chemical Formula 3:

[Chemical Formula 1]

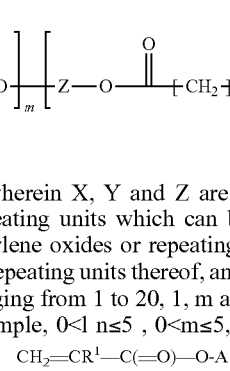

wherein X, Y and Z are the same or different, and are repeating units which can be divalent (or higher valence) alkylene oxides or repeating units thereof, alkylene groups or repeating units thereof, and each of x, y, and z is an integer ranging from 1 to 20, 1, m and n each are 0, 1 or greater, for example, 0<l n≤5, 0<m≤5, and 0<n≤5, $$CH_2=CR^1-C(=O)-O-A$$ [Chemical Formula 2]

wherein $R^1$ is selected from the group consisting of H, $C_1$ to $C_{10}$ hydrocarbons and $C_1$ to $C_{10}$ aromatic hydrocarbons, and A is selected from the group consisting of $C_1$ to $C_{20}$ hydrocarbons, and $C_1$ to $C_{20}$ halogenated hydrocarbons;

[Chemical Formula 3]

wherein $R^2$ is selected from the group consisting of H, $C_1$ to $C_{10}$ hydrocarbons and $C_1$ to $C_{10}$ aromatic hydrocarbons, and B is selected from the group consisting of $C_5$ to $C_{20}$ hydrocarbons, $C_5$ to $C_{20}$ aromatic hydrocarbons, and $C_5$ to $C_{20}$ halogenated aromatic hydrocarbons. The polymer electrolyte composition further includes a lithium salt and a non-aqueous organic solvent.

According to embodiments of the invention, a polymer electrolyte includes a cured product of the polymer electrolyte composition.

According to at least one embodiment, a lithium rechargeable battery includes a positive electrode, a negative electrode, a separator interposed between the positive electrode and the negative electrode, and the polymer electrolyte.

In the polymer electrolyte composition according to one embodiment of the present invention, since the viscosity of a pre-gel can be reduced, the polymer electrolyte composition can be uniformly impregnated into the electrode and the separator when being injected into the battery, so that precipitation of lithium can be reduced while increasing the battery capacity, thereby improving the reliability and safety of the resultant battery.

In addition, since the polymer electrolyte composition (e.g., the polymer electrolyte in the pre-gel state) is injected into the battery and then polymerized, the resultant polymer electrolyte demonstrates several advantages, such as leak prevention (or a reduction of the likelihood that a leak will occur), safety, high temperature stability, durability against external physical impact and so on.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Figure 1:
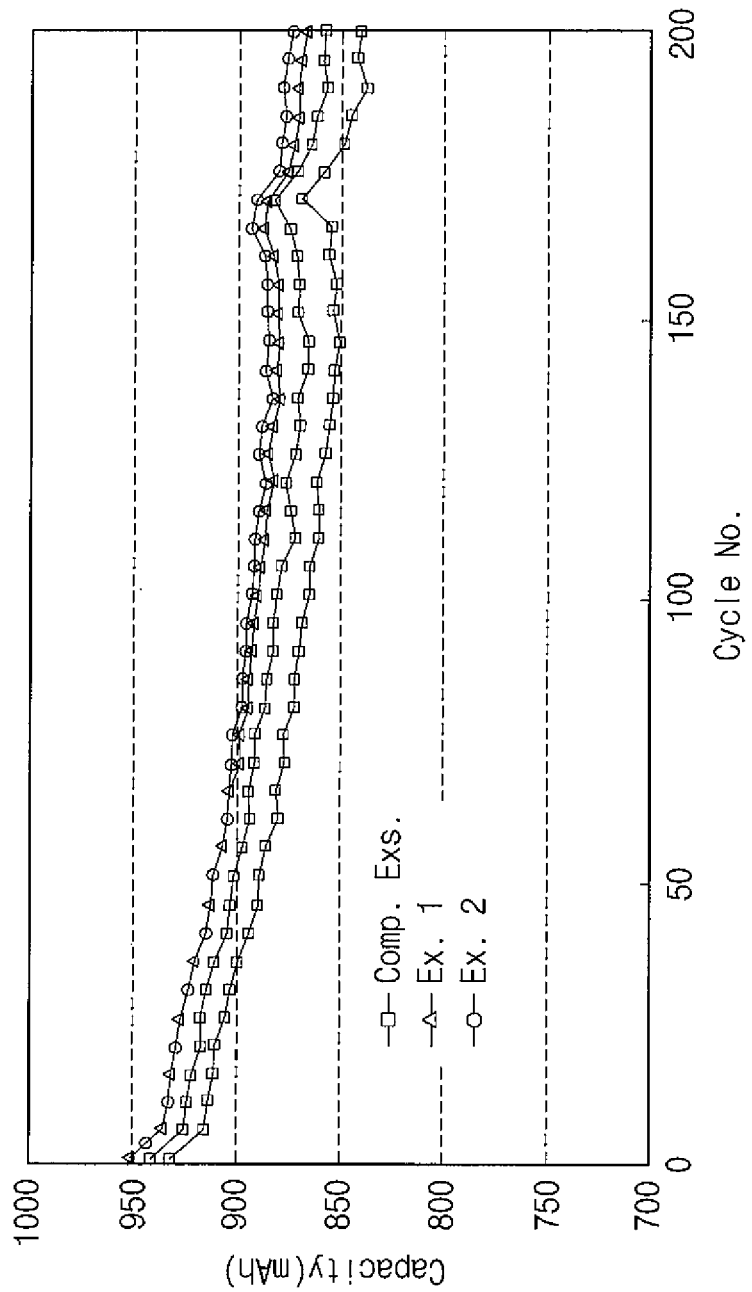
FIGS. 1 to 4 are graphs illustrating performance of batteries prepared in the Examples and Comparative Example.

Example embodiments of the present invention will now be described more fully hereinafter with reference to the accompanying drawings; however, the invention may be embodied in different forms and should not be construed as limited to the embodiments set forth herein. Rather, these embodiments are provided so that this disclosure will be thorough and complete, and will fully convey the scope of the disclosure to those skilled in the art.

Hereinafter, the polymer electrolyte composition and the polymer electrolyte according to embodiments of the present invention and the lithium rechargeable battery including the same will be described in more detail.

In one embodiment of the present invention, a polymer electrolyte composition includes a pre-gel composition including a first monomer represented by Chemical Formula 1, a second monomer represented by Chemical Formula 2 and a third monomer represented by Chemical Formula 3; a lithium salt; and a non-aqueous organic solvent.

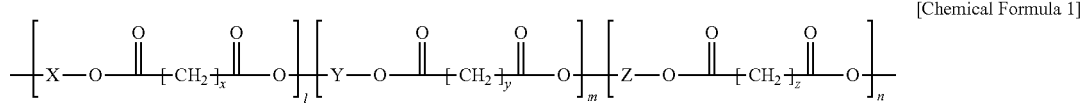
[Chemical Formula 1]

X, Y and Z may be the same or different, and are repeating units which can be divalent (or higher valence) alkylene oxides or repeating units thereof, alkylene groups or repeating units thereof. Each of x, y, and z may be an integer ranging from 1 to 20. Each of l, m and n may be 0, 1 or greater. For example, $0<l \leq 5$; $0<m \leq 5$; and $0<n \leq 5$.

[Chemical Formula 2]

$R^1$ may be selected from the group consisting of H, $C_1$ to $C_{10}$ hydrocarbons and $C_1$ to $C_{10}$ aromatic hydrocarbons. A may be selected from the group consisting of $C_1$ to $C_{20}$ hydrocarbons, and $C_1$ to $C_{20}$ halogenated hydrocarbons.

[Chemical Formula 3]

$R^2$ may be selected from the group consisting of H, $C_1$ to $C_{10}$ hydrocarbons and $C_1$ to $C_{10}$ aromatic hydrocarbons. B may be selected from the group consisting of $C_5$ to $C_{20}$ hydrocarbons, $C_5$ to $C_{20}$ aromatic hydrocarbons, and $C_5$ to $C_{20}$ halogenated aromatic hydrocarbons.

According to one embodiment of the present invention, a weight ratio of the first monomer to the third monomer is in a range of about 1:0.1 to about 1:0.3. When the weight ratio of the third monomer to the first monomer is too low, the viscosity cannot be sufficiently reduced as desired, thereby lowering injection efficiency of the polymer electrolyte composition. When the weight ratio of the third monomer to the first monomer is too high, polymerization occurring after being injected into the battery may not be sufficiently performed, thereby adversely affecting the safety of the resultant battery.

According to one embodiment of the present invention, the pre-gel composition includes the first monomer in an amount in a range of 50 to 75 wt %, the second monomer in an amount in a range of 20 to 30 wt % and the third monomer in an amount in a range of 2 to 20 wt %.

When the first monomer is included in the pre-gel composition in an excessively large amount, the viscosity of the pre-gel composition increases, thereby lowering the electrode impregnation capability. On the other hand, when the amount of the first monomer is too small, gelation of the pre-gel composition is difficult to achieve.

As the total amount of the second and third monomers included in the pre-gel composition increases, the viscosity of the pre-gel composition may be reduced. However, when the total amount of the second and third monomers in the pre-gel composition is excessively high, gelation of the pre-gel composition is difficult to achieve.

For example, a weight ratio of the first monomer to the second and third monomers can be appropriately adjusted, thereby improving the impregnation capability and improving characteristics of a gelled polymer matrix obtained from the pre-gel composition.

The polymer electrolyte composition according to embodiments of the present invention may include the pre-gel composition in an amount in a range of 1 to 10 wt % and an electrolyte solution in an amount in a range of 90 to 99 wt %, the electrolyte solution including a lithium salt and a non-aqueous organic solvent. If a relatively small amount (e.g., an amount outside of the ranges described herein) of the pre-gel composition is added to the polymer electrolyte composition, the reliability and safety of the resultant battery may be adversely affected. If an excessive amount of the pre-gel composition is added, battery performance may deteriorate due to increased side reactions in the battery by an increase of unreacted products and a reduction in the mobility of lithium ions.

If the amount of the pre-gel composition in the polymer electrolyte composition is too large, the viscosity of the polymer electrolyte composition increases, lowering the electrode impregnation capability and battery performance. If the amount of the pre-gel composition in the polymer electrolyte composition is too small, the amount of gelation in a polymer electrolyte obtained from the polymer electrolyte composition is reduced, lowering the safety of battery.

According to one embodiment of the present invention, the first monomer is synthesized to have a macro-monomer structure.

According to one embodiment of the present invention, the second monomer is hexyl acrylate

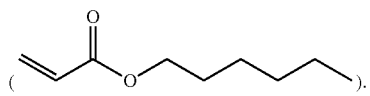

According to one embodiment of the present invention, the third monomer is tris[2-(acryloyloxy)ethyl]isocyanurate, or tris[2-(acryloyloxy)ethyl]cyanurate.

According to one embodiment of the present invention, the pre-gel composition further includes a polymerization initiator. As for the polymerization initiator, any suitable material that initiates polymerization of monomers, while not deteriorating the battery performance, may be used. An organic peroxide, for example, one or more organic peroxides, or azo-based compounds, may be used as the polymerization initiator. For example, azo-based compounds or organic peroxides and azo-based compounds may be used in combination.

Examples of the organic peroxide include peroxy dicarbonates, such as di(4-t-butylcyclohexyl)peroxydicarbonate, di-2-ethylhexyl peroxydicarbonate, di-isopropyl peroxydicarbonate, di-3-methoxy butyl peroxydicarbonate, t-butyl peroxy isopropyl carbonate, t-butyl peroxy 2-ethylhexyl carbonate, 1,6-bis(t-butyl peroxycarbonyloxy)hexane, diethylene glycol-bis(t-butyl peroxy carbonate), and the like; diacyl peroxides such as diacetyl peroxide, dibenzoyl peroxide, dilauroyl peroxide, bis-3,5,5-trimethyl hexanoyl peroxide, and the like; peroxy esters such as perhexyl pivalate, t-butyl peroxypivalate, t-amyl peroxypivalate, t-butyl peroxy-2-ethyl-hexanoate, t-hexylperoxy pivalate, 1,1,3,3-tetramethylbutyl peroxy neodecanoate, 1,1,3,3-tetramethyl butyl 2-ethylhexanoate, t-butyl peroxy 2-ethyl hexanoate, t-butyl peroxy isobutyrate, t-amylperoxy 3,5,5-trimethyl hexanoate, t-butyl peroxy 3,5,5-trimethyl hexanoate, t-butyl peroxy acetate, t-butyl peroxy benzoate, di-butylperoxy trimethyl adipate, and the like. Examples of the azo-based compound include 2,2'-azo-bis(isobutyronitrile), 2,2'-azo-bis(2,4-dimethylvaleronitrile), or 1,1'-azo-bis(cyanocyclo-hexane).

The polymerization initiator is used in an amount sufficient to initiate polymerization of the monomers. In one embodiment, the polymerization initiator is used in an amount in a range of about 200 to about 400 ppm based on the total weight of the pre-gel composition.

The lithium salt used in the polymer electrolyte according to embodiments of the present invention acts as a source of lithium ions in the battery, enabling the basic operation of the lithium battery. Examples of the lithium salt may include at least one selected from the group consisting of $LiPF_6$, $LiSbF_6$, $LiAsF_6$, $LiClO_4$, $LiCF_3SO_3$, $LiN(CF_3SO_2)_2$, $LiN(C_2F_6SO_2)_2$, $LiAlO_4$, $LiAlCl_4$, $LiN(C_xF_{2x+1}SO_2)(C_yF_{y+1}SO_2)$, where x and y are each a natural number, and $LiSO_3CF_3$.

In one embodiment, the concentration of the lithium salt is in a range of about 1.0 M to about 1.5 M. When the concentration of the lithium salt is less than about 1.0M, electrolyte conductivity and performance decrease. When the concentration of the lithium salt is greater than about 1.5 M, the viscosity of the electrolyte increases and the mobility of lithium ions decreases.

Non-limiting examples of suitable non-aqueous organic solvents include those generally used in the manufacture of lithium batteries, and examples thereof may include one or more selected from the group consisting of carbonates, esters, ethers, ketones, and nitriles. The carbonates can include dimethyl carbonate, ethyl methyl carbonate, diethyl carbonate, dipropyl carbonate, dibutyl carbonate, ethylene carbonate, propylene carbonate, butylene carbonate and the like. The esters can include methyl acetate, ethyl acetate, methyl hexanoate, methyl formate and the like. The ketones can include γ-butyrolactone, γ-valerolactone, γ-caprolactone, δ-valerolactone, ε-caprolactone and the like. The nitriles can include acetonitrile and the like.

When a carbonate-based solvent is used as the non-aqueous organic solvent, a mixture of cyclic and linear carbonates can be used.

The non-aqueous organic solvent can further include an aromatic hydrocarbon-based organic solvent. Examples of the aromatic hydrocarbon-based organic solvent may include benzene, fluorobenzene, toluene, fluorotoluene, trifluorotoluene, and xylene.

A lithium rechargeable battery according to embodiments of the present invention is fabricated by inserting an electrode assembly fabricated through a typical process into a battery case, the electrode assembly including a positive electrode, a separator, and a negative electrode. Then, a polymer electrolyte composition including a pre-gel composition is injected into the battery case, and the polymer electrolyte composition (including the pre-gel composition) is cured in the battery case. As the curing process is well known in the art, further description will not be provided herein. The polymerization reaction between monomers in the pre-gel composition is initiated by a polymerization initiator in the curing process, thereby forming a polymer. Thus, the final battery includes an electrolyte existing in the form of a polymer (e.g., a polymer electrolyte). Accordingly, a polymer electrolyte according to embodiments of the invention is a cured product of a polymer electrolyte composition. The battery case may be a metal can or a metal-laminated pouch.

The positive electrode may include a positive active material capable of reversibly intercalating and deintercalating lithium ions. The positive active material may include at least one selected from the group consisting of compounds represented by Chemical Formulas 4 to 15:

$Li_xMn_{1-y}M_yC_2$ [Chemical Formula 4]

$Li_xMn_{1-y}M_yO_{2-z}D_z$ [Chemical Formula 5]

$Li_xMn_2O_{4-z}D_z$ [Chemical Formula 6]

$Li_xCo_{1-y}M_yC_2$ [Chemical Formula 7]

$Li_xCo_{1-y}M_yO_{2-z}D_z$ [Chemical Formula 8]

$Li_xNi_{1-y}M_yC_2$ [Chemical Formula 9]

$Li_xNi_{1-y}M_yO_{2-z}C_z$ [Chemical Formula 10]

$Li_xNi_{1-y}Co_yO_{2-z}D_z$ [Chemical Formula 11]

$Li_xNi_{1-y-z}Co_yM_zC_\alpha$ [Chemical Formula 12]

$Li_xNi_{1-y-z}Co_yM_zO_{2-\alpha}D_\alpha$ [Chemical Formula 13]

$Li_xNi_{1-y-z}Mn_yM_zC_\alpha$ [Chemical Formula 14]

$Li_xNi_{1-y-z}Mn_yM_zO_{2-\alpha}D_\alpha$ [Chemical Formula 15]

wherein $0.90 \leq x \leq 1.1$, $0 \leq y \leq 0.5$, $0 \leq z \leq 0.5$, and $0 \leq \alpha \leq 2$; M is at least one element selected from the group consisting of Al, Ni, Co, Mn, Cr, Fe, Mg, Sr, V and rare-earth elements; and C is an element selected from the group consisting of O, F, S and P; and D is F, S or P.

The negative electrode includes a negative active material capable of reversibly intercalating and deintercalating lithium ions. Non-limiting examples of the negative active material include crystalline carbon, amorphous carbon, carbon-based negative active material of a carbon complex, and the like.

In some embodiments, each of the positive electrode and the negative electrode is fabricated by preparing an active material composition by mixing an active material, a conductive material and a binder in a solvent and coating the composition on a current collector. The electrode fabrication methods are well-known to those skilled in the related field.

Any suitable electrically conductive material may be used as the conductive material, unless it causes a chemical reaction in the battery. Examples of the conductive material include one or more of carbon black, acetylene black, ketjen black, carbon fiber, a metal powder or a metal fiber including copper, nickel, aluminum, silver, or the like.

The binder improves binding of the active material and the conductive material to the current collector. Examples of the binder include polyvinyl alcohol, carboxylmethyl cellulose, hydroxypropyl cellulose, diacetyl cellulose, polyvinylchloride, polyvinylpyrrolidone, polytetrafluoroethylene, polyvinylidene fluoride, polyethylene, polypropylene, a styrene-butadiene rubber (SBR), and the like.

Any suitable solvent that is generally used to efficiently disperse the active material, the conductive material, and the binder in preparation of the active material composition of the lithium rechargeable battery can be used as the solvent. Non-limiting examples of the solvent include N-methylpyrrolidone.

Hereinafter, the rechargeable battery including the electrode prepared according to one embodiment of the present invention will be described in detail.

Figure 5:
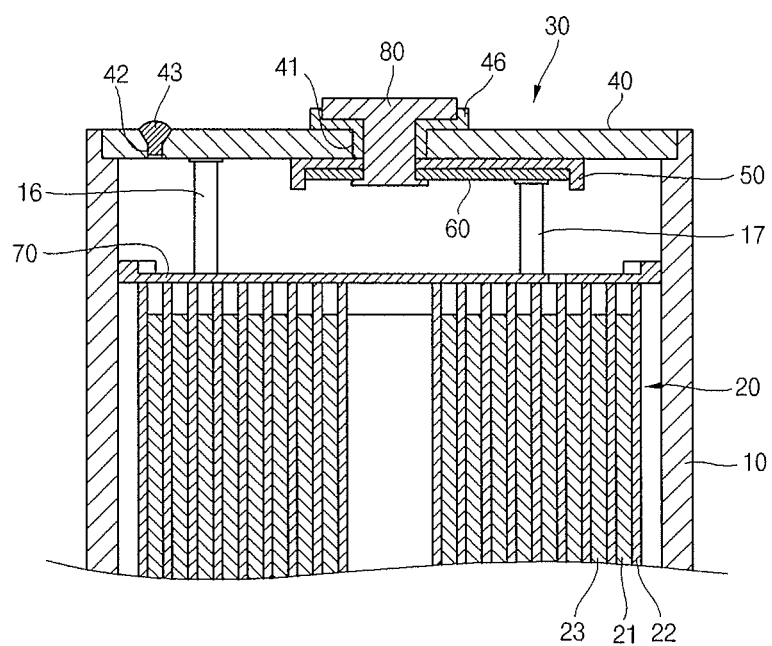
FIG. 5 is a partial cross-sectional view of a lithium rechargeable battery according to an embodiment of the present invention.

FIG. 5 is a partial cross-sectional view of a lithium rechargeable battery according to an embodiment of the present invention.

The following examples are provided for a better understanding of the present invention and technical details known in the related art are appropriately modified to be used as reference.

Referring to FIG. 5, the lithium rechargeable battery according to an embodiment of the present invention includes a can 10, an electrode assembly 20, a cap assembly 30 and a polymer electrolyte (e.g., a cured product of a polymer electrolyte composition). The lithium rechargeable battery is fabricated by accommodating the electrode assembly 20 and the polymer electrolyte in the can 10 and sealing a top end of the can 10 by the cap assembly 30.

The cap assembly 30 may include a cap plate 40, an insulation plate 50, a terminal plate 60 and an electrode terminal 80. The cap assembly 30 is coupled to an insulation case 70 to seal the can 10.

The electrode terminal 80 is inserted into a terminal hole 41 centrally located in the cap plate 40. When the electrode terminal 80 is inserted into the terminal hole 41, a tubular gasket 46 is coupled to an outer surface of the electrode terminal 80 to then be inserted into the terminal hole 41. Therefore, the electrode terminal 80 is electrically insulated from the cap plate 40.

The polymer electrolyte composition is injected into the can 10 through an electrolyte injection hole 42 after the cap assembly 30 is assembled to the top end of the can 10. The electrolyte injection hole 42 is closed by a separate plug 43. The electrode terminal 80 is connected to a negative electrode tab 17 of a negative electrode 23 or a positive electrode tab 16 of a positive electrode 21 to function as a negative electrode terminal or a positive electrode terminal. The battery also includes a separator 22 between the negative electrode 23 and the positive electrode 21.

The rechargeable battery including the electrode prepared according to one embodiment of the present invention may be fabricated in a cylindrical shape or a pouch shape as well as a prismatic shape, as illustrated herein.

The following examples illustrate the present invention in more detail. These examples, however, are not to be interpreted as limiting the scope of this disclosure.

Synthesis of First Monomer

Synthesis Example 1 of First Monomer 0.02 mol of polyester polyol (e.g., DR1515, available from DAERYUNG Enterprise Co. Ltd., having a number average molecular weight, or Mn, =1500; obtained by condensation of ethylene glycol ("EG"), diethylene glycol ("DEG"), and trimethylolpropane ("TMP") with adipic acid), 30 g of methylene chloride as a reaction solvent, and 0.04 mol of trimethylamine as a catalyst were added to a cooling bath and agitated to prepare a mixed solution. A mixed solution of 0.04 mol of acryloyl chloride and 15 g of methylene chloride was added to the mixed solution in a dropwise fashion. After completing the dropwise addition, the resultant solution was heated to 40° C. and agitated for 6 hours to deposit a salt. The deposited salt was filtered and the reaction solvent, that is, methylene chloride, was removed by distillation to obtain a target monomer P1 represented by Chemical Formula 16 and having a weight average molecular weight of about 25,000:

[Chemical Formula 16]

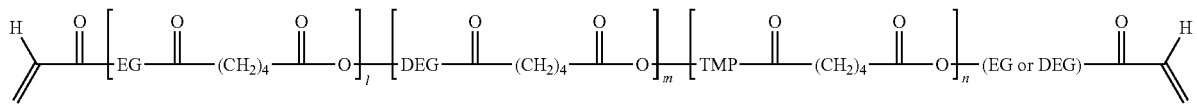

In Chemical Formula 16, l, m and n are 0, 1 or greater, and are controlled so that the weight average molecular weight of the monomer is about 25,000.

Example 1

(1) Polymer Electrolyte Composition 5 wt % of a pre-gel composition obtained by mixing the P1 as a first monomer prepared as in Synthesis Example 1 above, hexyl acrylate as a second monomer and tris[2-(acryloyloxy)ethyl]isocyanurate as a third monomer in a ratio of 67.5:25:7.5 wt %, respectively, was added to 95 wt % of an electrolyte solution including 1.3M LiPF6 dissolved in an ethylene carbonate:ethyl methyl carbonate mixture (mixed at a ratio of 30:70 vol %, respectively) to form a mixed solution. A polymer electrolyte composition was prepared by adding 2,2'-azobis(dimethylvaleronitrile) as a polymerization initiator in an amount of 350 ppm based on the weight of the pre-gel composition.

(2) Electrode Assembly

The positive electrode was fabricated by preparing a positive electrode active material slurry by mixing $LiCoO_2$ as a positive electrode active material, acetylene black as a conductive material and polyvinylidene fluoride as a binder in a weight ratio of 96:2:2, respectively, in N-methylpyrrolidone as a solvent. The positive electrode active material slurry was coated on an aluminum (Al) thin film having a thickness of 147 μm and a width of 4.9 cm using a 320 μm gap doctor blade, dried, pressed and then cut into a predetermined (or preset) size to fabricate the positive electrode.

The negative electrode was fabricated by preparing a negative electrode active material slurry by mixing artificial graphite and polyvinylidene fluoride as a binder in a weight ratio of 94:6, respectively, in N-methylpyrrolidone as a solvent. The negative active material slurry was coated on a copper (Cu) thin film having a thickness of 178 μm and a width of 5.1 cm using a 420 μm gap doctor blade, dried, pressed and then cut into a predetermined (or preset) size to fabricate the negative electrode.

A porous membrane made of polyethylene was positioned between the positive electrode and the negative electrode and then wound to form an electrode assembly in a jelly-roll configuration. The wound electrode assembly was put into an aluminum pouch.

(3) Fabrication of Rechargeable Battery

The polymer electrolyte composition including the pre-gel composition was injected into the aluminum pouch containing the electrode assembly and then sealed. The acquired product was heated in a hot-wind oven at about 75° C. for about 4 hours to complete the lithium rechargeable battery. The 1 C nominal capacity of the lithium rechargeable battery was about 920 mAh.

Example 2

A lithium rechargeable battery was fabricated by the same method as in Example 1, except that a pre-gel composition including the first monomer, the second monomer and the third monomer in a weight ratio of 60:25:15 (wt %), respectively, was used.

Example 3

A lithium rechargeable battery was fabricated by the same method as in Example 1, except that polyethylene glycol dimethacrylate (PEGDMA) was used as a third monomer, in place of tris[2-(acryloyloxy)ethyl]isocyanurate, and the pre-gel composition included the first monomer, the second monomer and the third monomer in a weight ratio of 60:25:15 (wt %), respectively.

Examples 4-10

A lithium rechargeable battery was fabricated by the same method as in Example 1, except that the first monomer, the second monomer and the third monomer were used in various ratios, as shown in Table 1.

TABLE 1

| | Pre-gel composition (wt % based on the weight of the polymer electrolyte composition) | Monomer Content (wt % based on the weight of the pre-gel composition) | | | Liquid type electrolyte solution (wt % based on the weight of the polymer electrolyte composition) |
|---|---|---|---|---|---|
| | | First monomer | Second monomer | Third monomer | |
| Example 1 | 5 | 67.5 | 25.0 | 7.5 | 95 |
| Example 2 | 5 | 60.0 | 25.0 | 15.0 | 95 |
| Example 3 | 5 | 60.0 | 25.0 | 15.0 | 95 |
| Example 4 | 5 | 68.0 | 25.0 | 7.0 | 95 |
| Example 5 | 5 | 68.5 | 25.0 | 6.5 | 95 |
| Example 6 | 5 | 55.5 | 25.0 | 19.5 | 95 |
| Example 7 | 5 | 65.5 | 15.0 | 19.5 | 95 |
| Example 8 | 5 | 60 | 31.5 | 8.5 | 95 |
| Example 9 | 12 | 60.0 | 25.0 | 15.0 | 88 |
| Example 10 | 0.5 | 60.0 | 25.0 | 15.0 | 99.5 |
| Comparative Example 1 | 5 | 75.0 | 25.0 | — | 95 |

Experimental Example 1: Measurement of Viscosity

Viscosities of the pre-gel compositions prepared in Examples 1-10 and Comparative Example 1 were measured using a cone-plate type LVDV-II+Pro Viscometer manufactured by Brookfield Engineering Laboratories, Inc., in a dry room in which ambient temperature was constantly maintained at 20° C. S40 spindles were used as measuring spindles, rotation velocity was maintained at 15 revolutions per minute, and specimen loading was set to 1 mL.

Experimental Example 2: Evaluation of Capacity

Lithium rechargeable batteries fabricated in the Examples and Comparative Example were charged and discharged once under each of the following test procedures. Relative discharge capacities measured using the third procedure were determined as capacities of the respective batteries.

First, each lithium rechargeable battery cell was charged at 0.2 C to the cut-off condition of 4.2 V/20 mA and discharged at 0.2 C to 2.75 V.

Second, each lithium rechargeable battery cell was charged at 0.5 C to the cut-off condition of 4.2 V/20 mA and discharged at 0.2 C to 2.75 V.

Third, each lithium rechargeable battery cell was charged at 1.0 C to the cut-off condition of 4.2 V/0.1 C and discharged at 0.2 C to 3 V.

Experimental Example 3: Evaluation of Room Temperature Cycle-Life Characteristics The lithium rechargeable batteries fabricated in Examples 1-10 and Comparative Example 1 were charged up to about 4.2 V at a charge rate of about 0.1 C, and discharged to about 3.0 V at a discharge rate of about 1.0 C for 300 cycles. Cycle-life efficiency (%)=discharge capacities for 300 cycles/1.0 C discharge capacity (920 mAh) was calculated and the results are as shown in the following Table 2 and FIG. 1.

Experimental Example 4: Evaluation of 60° C. Cycle-Life Characteristic

Figure 2:
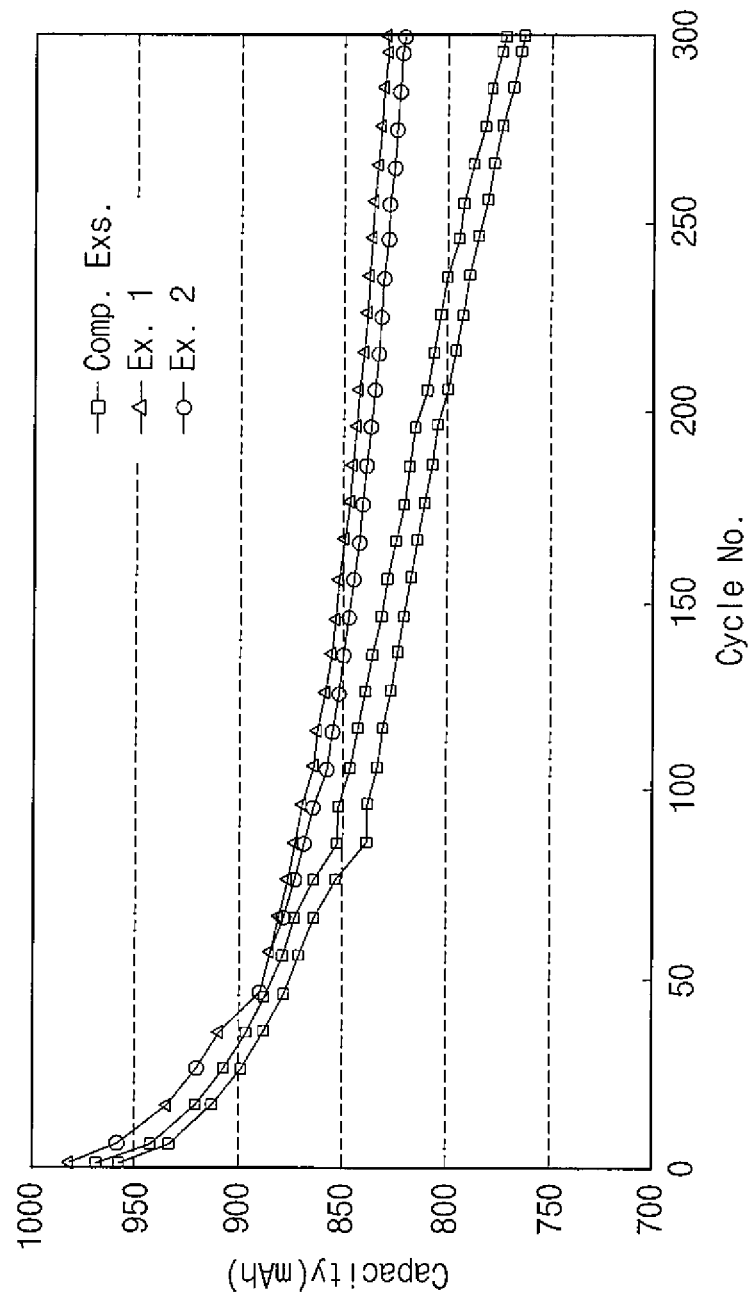

The cycle-life characteristics of the lithium rechargeable batteries fabricated in Examples 1-10 and Comparative Example 1 were evaluated in the same condition as in Experimental Example 3 for evaluating Room temperature cycle-life characteristic, except that the evaluation was conducted at 60° C. The results are as shown in the following Table 2 and FIG. 2.

Experimental Example 5: Evaluation of Heat Exposure Characteristic

Figure 3:
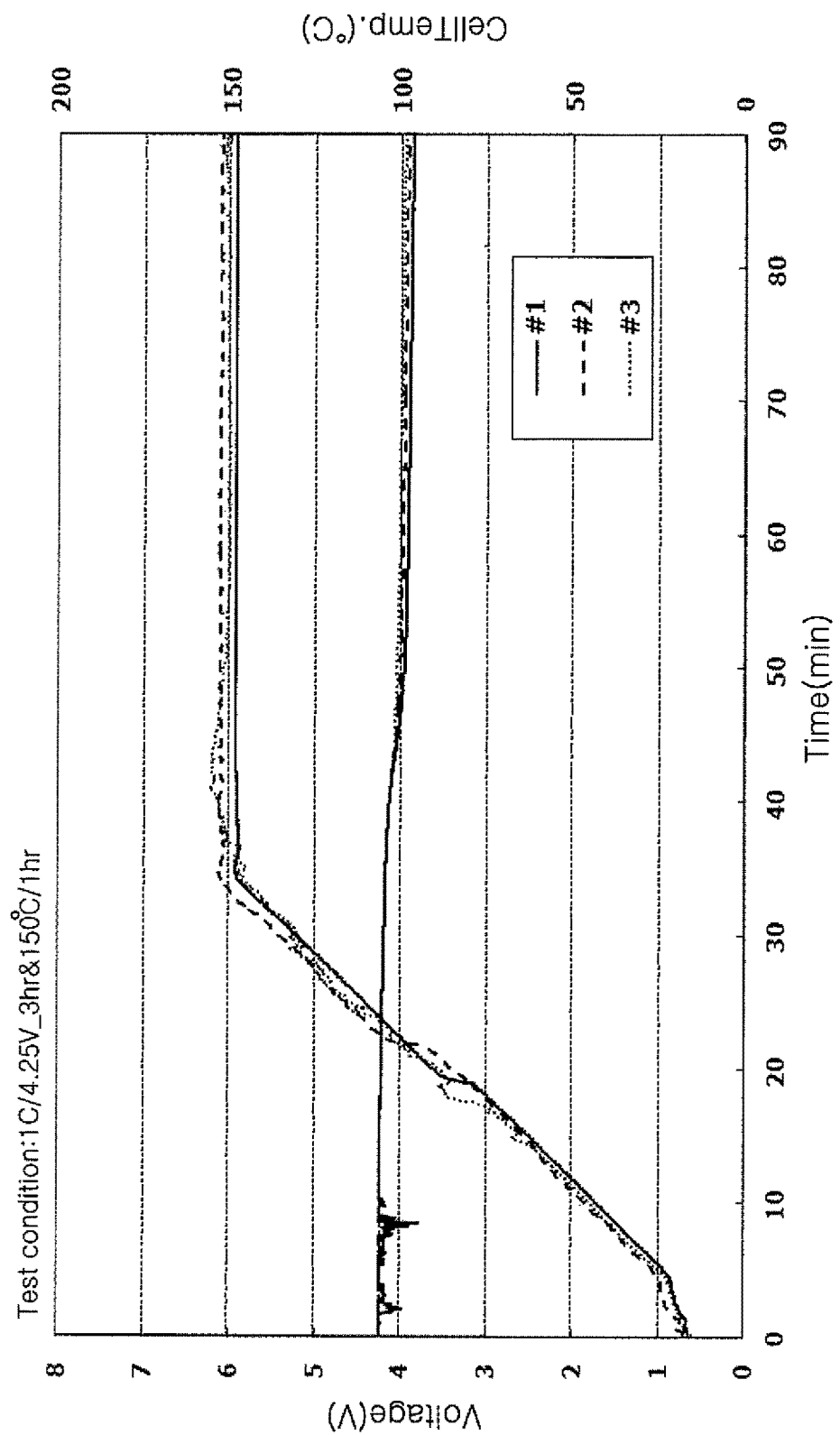
Figure 4:
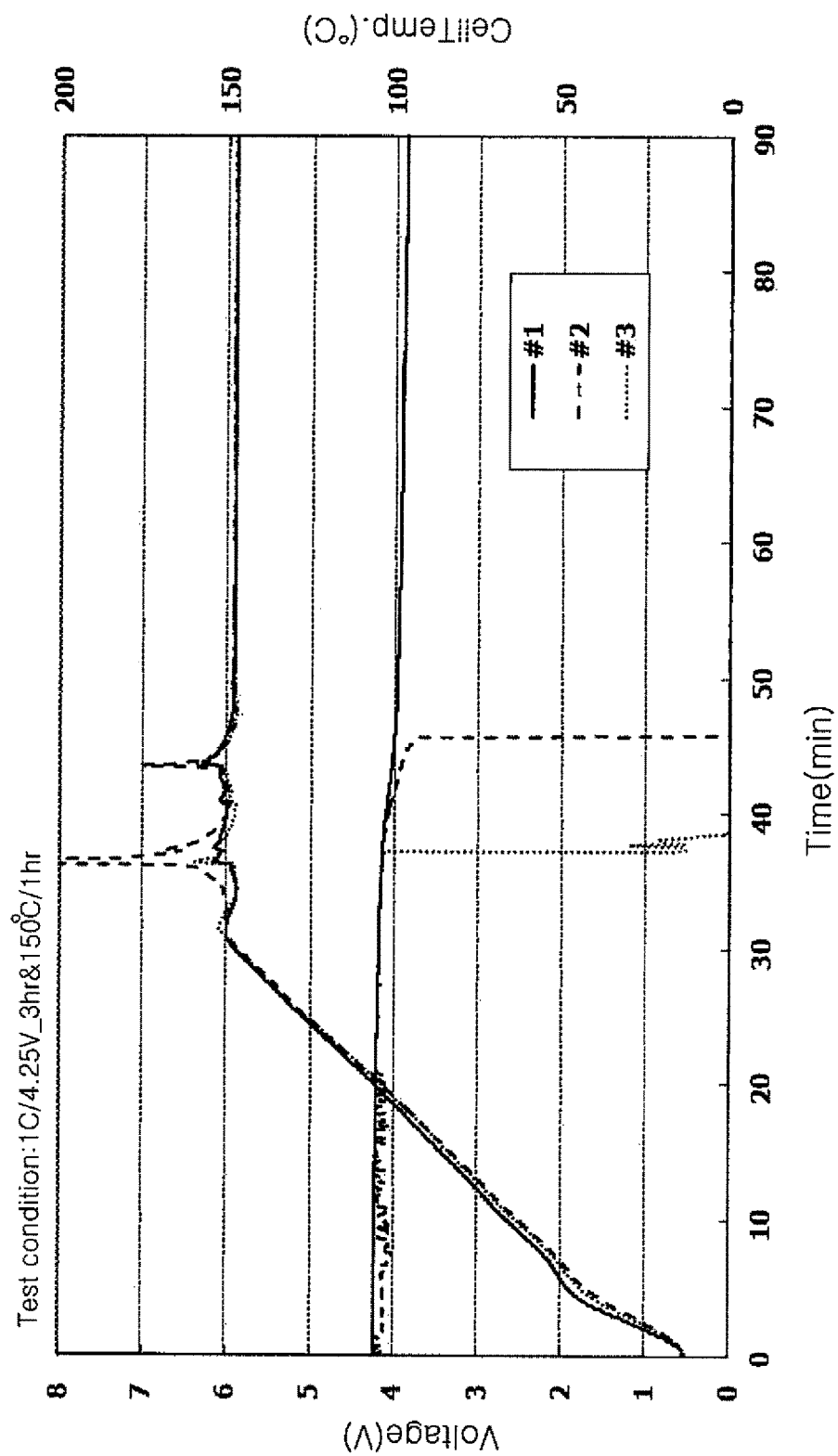

In a 3.0 V discharged state, the lithium rechargeable batteries fabricated in Examples 1-10 and Comparative Example 1 were charged under 1 C/4.25 V_3 hr cutoff conditions, as described below, and the heat exposure characteristics were then evaluated. The temperature of the evaluation chamber was elevated from room temperature up to 150° C. for 30 minutes, and then subjected to heat exposure evaluation while maintaining the temperature of the chamber at 150° C. for 1 hour. The results are as shown in the following Table 2 and FIGS. 3 and 4. FIG. 3 shows heat exposure evaluation results of three battery cells fabricated according to the procedure described with respect to Example 1, and the three battery cells exhibited acceptable performance and were marked as OK. FIG. 4 shows heat exposure evaluation results of three battery cells fabricated according to the procedure described with respect to Comparative Example 1, and one battery cell exhibited acceptable performance and was marked as OK and two battery cells exhibited unsatisfactory performance and were marked as NG.

Experimental Example 6: Evaluation of High-Temperature Penetration Safety

In a 3.0 V discharged state, the lithium rechargeable batteries fabricated in Examples 1-10 and Comparative Example 1 were charged under 1 C/4.25 V_3 hr cutoff conditions, as described above, and then evaluated in a chamber having a temperature of 55° C. When surface temperatures of the batteries reached 55° C., a penetration pin with a dimension of 2.5φ was penetrated into the batteries at a rate of 40 mm/sec. The batteries were marked as OK or NG according to whether there was ignition in the batteries or not. If a battery experienced ignition, the battery was marked as NG. If a battery did not experience ignition, the battery was marked as OK. The results of Experimental Examples 1 to 6 are shown in the following Tables 2 and FIG. 4.

TABLE 2

|  | Viscosity (cP) | Battery Capacity (mAh) | Room Temperature Cycle Life Efficiency (%) (300 cycles) | 60° C. Cycle Life Efficiency (%) (300 cycles) | 150° C. Heat Exposure | High Temperature Penetration (55° C.) |
|---|---|---|---|---|---|---|
| Example 1 | 11.0 | 974 | 93 | 90 | 3OK | 3OK |
| Example 2 | 10.1 | 975 | 93 | 90 | 3OK | 3OK |
| Example 3 | 10.9 | 954 | 77 | 73 | 3NG | 3NG |
| Example 4 | 11.2 | 968 | 91 | 88 | 3OK | 3OK |
| Example 5 | 11.3 | 967 | 91 | 87 | 3OK | 3OK |
| Example 6 | 9.5 | 970 | 89 | 85 | — | — |
| Example 7 | 10.8 | 972 | 89 | 85 | — | — |
| Example 8 | 10.2 | 970 | 88 | 84 | — | — |
| Example 9 | 21.3 | 941 | 78 | 72 | 3OK | 3OK |
| Example 10 | 7.3 | 980 | 86 | 82 | 3NG | 3NG |
| Comparative Example 1 | 11.6 | 965 | 90 | 83 | 1OK, 2NG | 3OK |

As shown in Table 2, in Examples 1 and 2, and Examples 4 to 8 in which third monomers were included, the battery capacity and cycle-life characteristics were better than in Comparative Example 1 in which no third monomer was included. In addition, the batteries fabricated in Examples 1 and 2, and Examples 4 to 8 demonstrated improved safety characteristics (150° C. heat exposure), compared to the battery fabricated in Comparative Example 1.

However, even in a case where the third monomer was added, when amounts of the third monomers added are too small (e.g., Example 5) or too large (e.g., Example 6), the batteries demonstrated poor battery capacity and cycle life characteristics, compared to the batteries fabricated in Examples 1 and 2.

When the amount of the second monomer added is too small (e.g., Example 7), the battery demonstrated poor cycle life characteristics, compared to the batteries fabricated in Examples 1 and 2. When the amount of the second monomer added is too large (e.g., Example 8), the battery demonstrated a considerably degraded high-temperature cycle life characteristic.

In addition, in Example 9 in which a considerably large amount of the pre-gel composition was added to the polymer electrolyte composition, the battery had deteriorated capacity and cycle-life characteristics due to an increase in resistance as a result of the presence of an excessively large amount of polymer.

Conversely, in Example 10 in which a relatively small amount of the pre-gel composition was added to the polymer electrolyte composition, the battery had deteriorated cycle-life and safety characteristics while having improved capacity, as compared to the batteries fabricated in Examples 1 and 2.

In Example 3 in which polyethylene glycol dimethacrylate (PEGDMA) was used as a third monomer (e.g., a third monomer having a different structure from the third monomers used in Examples 1 and 2), the reliability and safety characteristics of the battery fabricated in Example 3 were both lowered, as compared to the batteries of Examples 1 and 2.

Therefore, it is understood that the polymer electrolyte according to embodiments of the present invention can provide a rechargeable battery having excellent cycle-life and safety characteristics.

Exemplary embodiments have been disclosed herein, and although specific terms are employed, they are used and are to be interpreted in a generic and descriptive sense. Accordingly, it will be understood by those of ordinary skill in the art that various changes in form and details may be made without departing from the spirit and scope of the present disclosure as set forth in the following claims.

What is claimed is:

1. A polymer electrolyte composition comprising:
a pre-gel composition including a first monomer represented by Chemical Formula 1, a second monomer represented by Chemical Formula 2 and a third monomer represented by Chemical Formula 3:

[Chemical Formula 1]

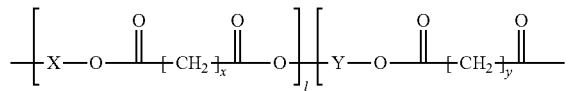

-continued

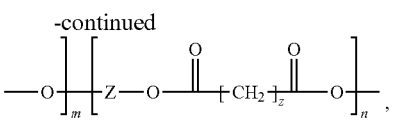

wherein X, Y and Z are the same or different, and are repeating units of divalent or trivalent alkylene oxides or repeating units thereof, alkylene groups or repeating units thereof, and each of x, y, and z is an integer ranging from 1 to 20, $0<l\leq5$, $0<m\leq5$, and $0<n\leq5$, $$CH_2=CR^1-C(=O)-O-A,$$ [Chemical Formula 2]

wherein $R^1$ is selected from the group consisting of H, $C_1$ to $C_{10}$ hydrocarbons and $C_6$ to $C_{10}$ aromatic hydrocarbons, and A is selected from the group consisting of $C_1$ to $C_{20}$ hydrocarbons, and $C_1$ to $C_{20}$ halogenated hydrocarbons, $$[CH_2=CR^2-C(=O)-O-]_3B,$$ [Chemical Formula 3]

wherein $R^2$ is H and B is isocyanurate or cyanurate;

a lithium salt; and a non-aqueous organic solvent, wherein the polymer electrolyte composition comprises the pre-gel composition in an amount in a range of 1 to 10 wt %, based on the weight of the polymer electrolyte composition, the pre-gel composition comprises the first monomer in an amount in a range of 50 to 75 wt %, the second monomer in an amount in a range of 20 to 30 wt % and the third monomer in a range of 2 to 20 wt %, based on the weight of the pre-gel composition, a weight ratio of the first monomer to the third monomer is in a range of about 1:0.1 to about 1:0.3.

2. The polymer electrolyte composition as claimed in claim 1, wherein in the third monomer comprises tris[2-(acryloyloxy)ethyl]isocyanurate.

3. A polymer electrolyte comprising a cured product of the polymer electrolyte composition as claimed in claim 1.

4. The polymer electrolyte as claimed in claim 3, wherein in the third monomer represented by Chemical Formula 3, comprises tris[2-(acryloyloxy)ethyl]isocyanurate.

5. A lithium rechargeable battery comprising:
a positive electrode;
a negative electrode;
a separator interposed between the positive electrode and the negative electrode; and
the polymer electrolyte as claimed in claim 3.

6. The lithium rechargeable battery as claimed in claim 5, wherein in the third monomer represented by Chemical Formula 3, comprises tris[2-(acryloyloxy)ethyl]isocyanurate.

7. A polymer electrolyte composition comprising:
a pre-gel composition including a first monomer represented by Chemical Formula 16, a second monomer comprising hexyl acrylate, and a third monomer comprising tris[2-(acryloyloxy)ethyl]isocyanurate:

[Chemical Formula 16]

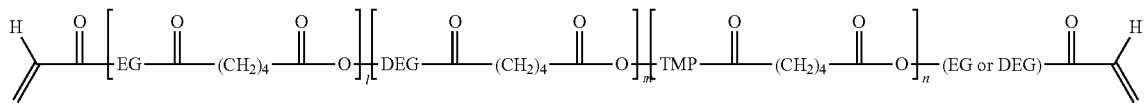

wherein l, m, and n are 0, 1 or greater and are controlled so that the average molecular weight of the first monomer is about 25,000;
a lithium salt; and
a non-aqueous organic solvent,
wherein the polymer electrolyte composition comprises the pre-gel composition in an amount in a range of 1 to 10 wt %, based on the weight of the polymer electrolyte composition, the pre-gel composition comprises the first monomer in an amount in a range of 50 to 75 wt %, the second monomer in an amount in a range of 20 to 30 wt % and the third monomer in a range of 2 to 20 wt %, based on the weight of the pre-gel composition, wherein a weight ratio of the first monomer to the third monomer is in a range of about 1:0.1 to about 1:0.3.

* * * * *